US011689072B2

(12) United States Patent
Schiedermeier et al.

(10) Patent No.: US 11,689,072 B2
(45) Date of Patent: Jun. 27, 2023

(54) DEMAGNETIZATION OF THE ROTOR OF AN EXTERNALLY EXCITED SYNCHRONOUS MACHINE

(71) Applicant: AUDI AG, Ingolstadt (DE)

(72) Inventors: Maximilian Schiedermeier, Ingolstadt (DE); Stephan Brüske, Ingolstadt (DE)

(73) Assignee: AUDI AG, Ingolstadt (DE)

(*) Notice: Subject to any disclaimer, the term of this patent is extended or adjusted under 35 U.S.C. 154(b) by 226 days.

(21) Appl. No.: 17/016,194

(22) Filed: Sep. 9, 2020

(65) Prior Publication Data

US 2021/0075277 A1    Mar. 11, 2021

(30) Foreign Application Priority Data

Sep. 10, 2019  (DE) .................. 102019124212.6

(51) Int. Cl.
| | | |
|---|---|---|
| *H02K 1/27* | (2022.01) | |
| *H02K 21/14* | (2006.01) | |
| *H02M 1/34* | (2007.01) | |
| *H02P 25/022* | (2016.01) | |
| *H02K 1/276* | (2022.01) | |

(52) U.S. Cl.
CPC ............ *H02K 1/276* (2013.01); *H02K 21/14* (2013.01); *H02M 1/34* (2013.01); *H02P 25/022* (2013.01)

(58) Field of Classification Search
CPC ......... H02P 25/022; H02P 9/14; H02K 1/276; H02K 19/12; H02K 21/14; H01F 13/006; H02M 1/34

USPC .................................................. 310/156.53
See application file for complete search history.

(56) References Cited

U.S. PATENT DOCUMENTS

| | | | | |
|---|---|---|---|---|
| 5,473,227 A | * | 12/1995 | Arnaud ................. | B06B 1/0261 318/695 |
| 5,844,786 A | * | 12/1998 | Yoshida ............ | H02M 3/33561 363/21.01 |
| 7,049,786 B1 | * | 5/2006 | Toliyat ...................... | H02P 3/18 318/400.06 |
| 7,804,253 B2 | * | 9/2010 | Fischer .................. | H02M 3/156 315/223 |
| 8,188,678 B2 | * | 5/2012 | Siessegger ............. | H05B 45/37 315/297 |
| 8,963,476 B2 | | 2/2015 | Illiano | |
| 9,069,020 B2 | * | 6/2015 | Fahlenkamp .......... | G01R 22/06 |
| 9,647,594 B2 | * | 5/2017 | Chen ..................... | H02P 25/092 |
| 2002/0089303 A1 | * | 7/2002 | Aiello .................... | H02P 25/092 318/727 |
| 2012/0081818 A1 | * | 4/2012 | Mazumdar ............. | H02P 27/06 361/23 |

FOREIGN PATENT DOCUMENTS

| | | |
|---|---|---|
| DE | 15 88 055 C3 | 4/1976 |
| DE | 32 41 086 A1 | 5/1984 |
| DE | 10 2005 043 972 A1 | 3/2007 |
| DE | 10 2005 050 551 A1 | 4/2007 |
| DE | 10 2009 024 362 A1 | 12/2010 |

* cited by examiner

*Primary Examiner* — Alex W Mok
(74) *Attorney, Agent, or Firm* — Seed IP Law Group LLP

(57) ABSTRACT

The present disclosure relates to a circuit device for demagnetizing the rotor of an externally excited synchronous machine and to a method for operating the circuit device.

10 Claims, 5 Drawing Sheets

DEMAGNETIZATION OF THE ROTOR OF AN EXTERNALLY EXCITED SYNCHRONOUS MACHINE

BACKGROUND

Technical Field

The present disclosure relates to a circuit device for demagnetizing the rotor of an externally excited synchronous machine and to a method for operating the circuit device.

Description of the Related Art

Electrical machines, such as asynchronous machines (ASM), permanently excited synchronous machines (PSM) or externally excited synchronous machines (EESM), are normally used for electrical traction in the field of e-mobility.

In this case, the externally excited synchronous machine has the feature that its rotor is neither a cage winding as in the ASM nor an element equipped with permanent magnets as in the PSM, but in simplified terms is a rotating coil. The current passing through the coil can be regulated by appropriate electronics. In this case, the current is crucial for the regulation of the electric machine or for the regulation of the traction of the vehicle.

The regulation of the EESM is usually effected by a pulse-width modulated inverter (PWM) to which an intermediate circuit capacitor is usually assigned. Furthermore, the stator windings of the EESM are controlled by six switches, and their alternating voltage or alternating current is regulated. The PWM is usually connected to and supplied via a high-voltage battery.

A typical circuit is shown in FIG. 1. The intermediate circuit capacitor C and the switching elements $S_1$ to $S_6$ which control the stator windings of the EESM are shown. The circuit of the rotor winding $W_R$ is connected in parallel to the intermediate circuit capacitor C. The circuit additionally includes the switching elements $S_7$ and $S_8$ and the diodes $D_1$ and $D_2$, by means of which the current through the rotor of the EESM can be regulated.

If the rotor is to be demagnetized (for example in the case of a collision or another critical driving situation) the following possibilities exist:

1. Switches $S_7$ and $S_8$ are opened. The current then passes through the diode $D_1$, through the intermediate circuit capacitor C, and through the diode $D_2$. This further charges the capacitor C. There is a risk of overcharging the capacitor. In the worst case, this can lead to failure of the component or of another component due to overvoltage;

2. Switch $S_7$ is opened and switch $S_8$ remains closed. The current flows through the switch $S_8$ and the diode $D_2$. This reduces the magnetization of the rotor, but it takes place very slowly. Depending on the resistance of the rotor and on the voltage drops across the semiconductors, it can take a long time. Furthermore, the energy in the resistor and the semiconductors is dissipated. In other words, electrical energy is converted into thermal energy, which has then become unusable for the vehicle and its traction;

3. Switch $S_8$ is opened and switch $S_7$ remains closed. The current now flows through the diode $D_1$ and the switch $S_7$. A disadvantage here, as also with Possibility 2, is the long demagnetization time and the loss of usable electrical energy.

DE 32 41 086 A1 discloses an arrangement for reducing the loss of electrical energy stored in a relief network. Energy stored in a motor winding is output to capacitors in the relief network during a switching operation of an inverter and is transferred to another location in the circuit.

DE 10 2009 024 362 A1 relates to a power supply circuit for an industrial truck. Energy transportation in the energy supply circuit of an asynchronous machine in the industrial truck generates a magnetic field in a coil, wherein, when the magnetic field decays, a current is generated which is stored in a capacitor of the energy supply circuit.

DE 10 2005 050 551 A1 discloses an energy supply unit for a motor vehicle and a method for operating the energy supply unit. Energy produced when a magnetic field of a coil of the motor vehicle decays is stored temporarily in a capacitor and is used to supply consumers in the vehicle.

BRIEF DESCRIPTION

Embodiments of the present disclosure provide a circuit device and a method for demagnetizing the rotor of an externally excited synchronous machine (EESM) which enable a safe and rapid demagnetization of the rotor and, if possible, prevent the conversion of electrical energy into heat.

In one embodiment, the energy stored in the magnetic field of the rotor is converted into electrostatic energy by means of a snubber circuit with a capacitor. In the event of a fault, the capacitor can absorb the energy stored in the rotor of the EESM.

The present disclosure provides a circuit device for demagnetizing the rotor of an EESM, including at least one circuit connected to the poles of a rotor winding of the EESM and having a diode, a capacitor connected downstream of the diode, and a first switch.

To demagnetize the rotor, the switch is closed. The current of the rotor flows through the diode into the capacitor. This charges the capacitor. The further the capacitor charges, the faster the magnetic energy of the rotor is dissipated. When the magnetic energy of the rotor has gone to zero, the current flow will also have gone to zero. The diode prevents a current flow from the capacitor back into the rotor.

In one embodiment, a first resistor is connected in parallel with the capacitor, through which the energy of the capacitor can be dissipated.

In another embodiment, the positive electrode of the capacitor is connected via a second switch to the positive pole of the rotor winding, and the negative electrode of the capacitor is connected via a third switch to the negative pole of the rotor winding.

As soon as the driving operation of the vehicle is to be resumed, the energy of the capacitor can be converted back into magnetic energy in the rotor by opening the first switch and closing the second and third switches. When the capacitor has discharged to 0 V, the second and third switches are opened again.

In a further embodiment, the positive electrode of the capacitor is connected via a fourth switch to the positive electrode of an intermediate circuit capacitor of the EESM, and the negative electrode of the capacitor is connected to the negative electrode of the intermediate circuit capacitor via a second resistor and a fifth switch. Alternatively, the second resistor can also be arranged in series with the fourth switch, i.e., in the branch of the circuit connected to the positive electrode of the capacitor.

By closing the fourth and fifth switches, the capacitor and the intermediate circuit capacitor are parallelized. If the magnetic energy of the rotor is stored in the capacitor, at least part of the stored energy can enter the intermediate circuit capacitor. The second resistor arranged in series with the capacitor provides for a limitation of the charge-reversal current. This embodiment only allows matching of the voltages of the capacitor and those of the intermediate circuit capacitor. A complete transfer of electrostatic energy from the capacitor into the intermediate circuit capacitor is not hereby possible.

In another embodiment, a storage inductor is connected in parallel with the capacitor. The poles of the storage inductor are connected via a sixth and seventh switch to the electrodes of the capacitor and via an eighth and ninth switch to the electrodes of an intermediate circuit capacitor of the EESM.

When the capacitor is charged, the storage inductor can be charged by closing the sixth and seventh switches. The sixth and seventh switches are then opened, and the eighth and ninth switches are closed. The current stored in the storage inductor then flows through the intermediate circuit capacitor and charges the intermediate circuit capacitor. This procedure can be repeated until the charge of the capacitor is dissipated and has been transferred into the intermediate circuit capacitor.

Said switches can be embodied as mechanical, electromechanical or electronic switches, or a combination of semiconductor switches and electromechanical switches. Examples of suitable electronic switches are power semiconductor switches such as IGBTs, MOSFETs or thyristors. Examples of suitable electromechanical switches are contactors and relays.

In one embodiment, said diodes are embodied as conventional semiconductor diodes. In a further embodiment, the diodes are embodied as Schottky diodes.

A method for demagnetizing the rotor of an EESM using a circuit device according to the disclosure is also provided, i.e., a method for operating a circuit device according to the disclosure.

In one embodiment of the method, at least one switching device according to principles of the present disclosure is electrically conductively connected to the poles of at least one rotor winding of the EESM, and electromagnetic energy stored in the rotor winding is transferred to the capacitor of the circuit device.

In one embodiment of the method, electrical energy stored in the capacitor is returned to the rotor winding when driving operation of the vehicle is to be resumed.

In another embodiment of the method, electrical energy stored in the capacitor of the circuit device is transferred at least in part into an intermediate circuit capacitor of the EESM. For this purpose, the capacitor and the intermediate circuit capacitor are parallelized.

In another embodiment of the method, electrical energy stored in the capacitor of the circuit device is transferred at least in part into a storage inductor. For this purpose, the capacitor and the storage inductor are connected in parallel.

In another embodiment, electromagnetic energy is then transferred from the storage inductor into an intermediate circuit capacitor of the EESM. For this purpose, the intermediate circuit capacitor and the storage inductor are connected in parallel.

In one embodiment of the method, the capacitor and the storage inductor are connected in parallel until the capacitor is completely discharged. The poles of the storage inductor are then disconnected from the electrodes of the capacitor and connected to the electrodes of the intermediate circuit capacitor until the current flow through the storage inductor has gone to zero.

In another embodiment of the method, the capacitor is alternately connected to the storage inductor and the storage inductor connected to the intermediate circuit capacitor, wherein in each case only a part of the electrical energy stored in the capacitor is transferred; and these steps are repeated until the capacitor is completely discharged. In one embodiment, the steps are repeated with a high frequency.

The advantages of the circuit device according to principles of the present disclosure and the method according to principles of the present disclosure include that they protect the components of the EESM from overvoltage and increase the energy efficiency of the overall system, since the magnetic energy of the rotor can be stored and reused.

Additional advantages and embodiments of the present disclosure result from the description and the accompanying drawings.

It goes without saying that the features mentioned above and the features yet to be explained below can be used not only in the combination specified in each case but also in other combinations or alone, without departing from the scope of the present disclosure.

BRIEF DESCRIPTION OF THE SEVERAL VIEWS OF THE DRAWINGS

The disclosure is illustrated schematically in the drawings by means of embodiments and will be described in more detail with reference to the drawings. The following is shown.

DETAILED DESCRIPTION

Figure 1:
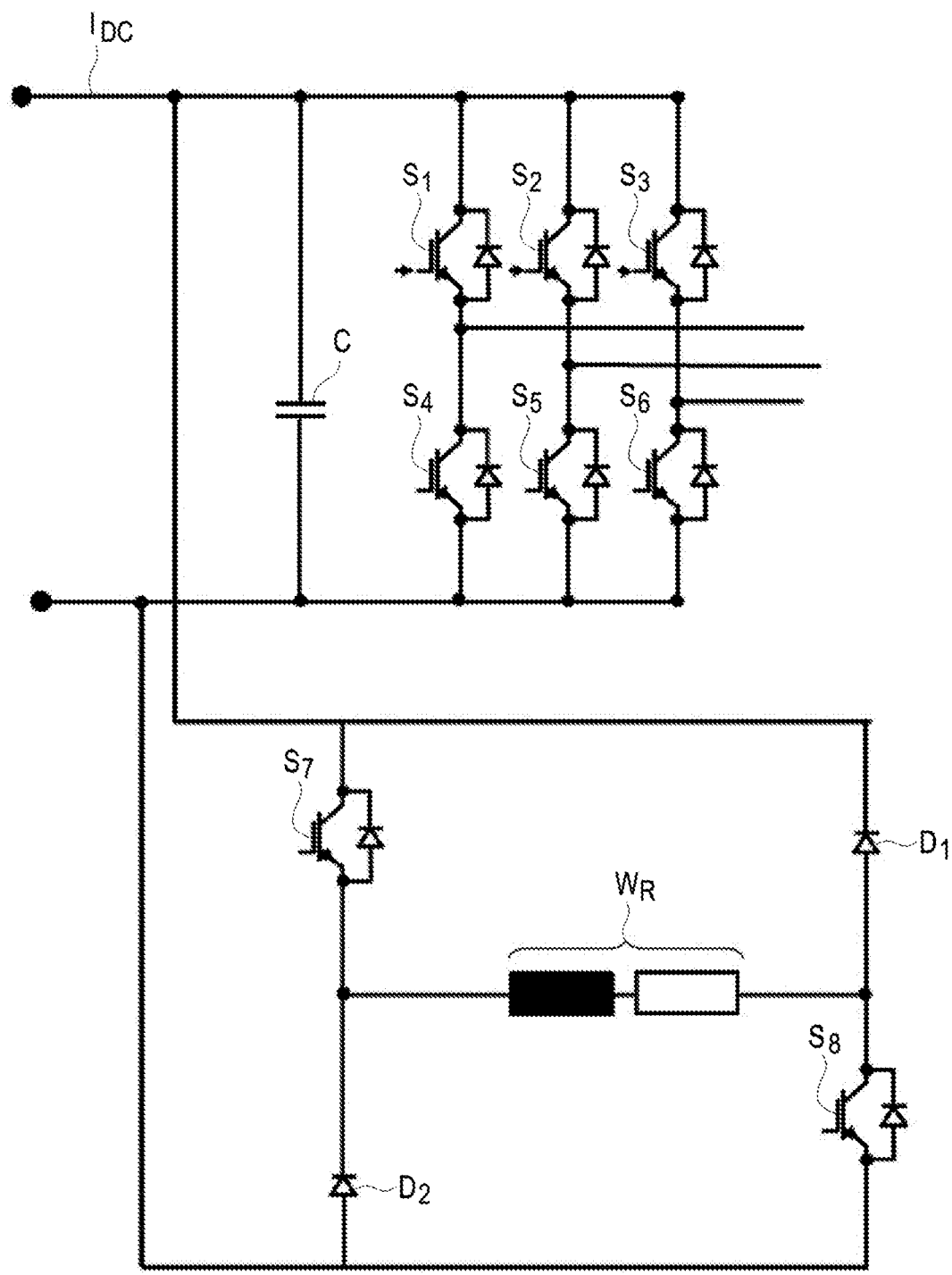
FIG. 1 a circuit diagram of an EESM according to the prior art.
Figure 2:
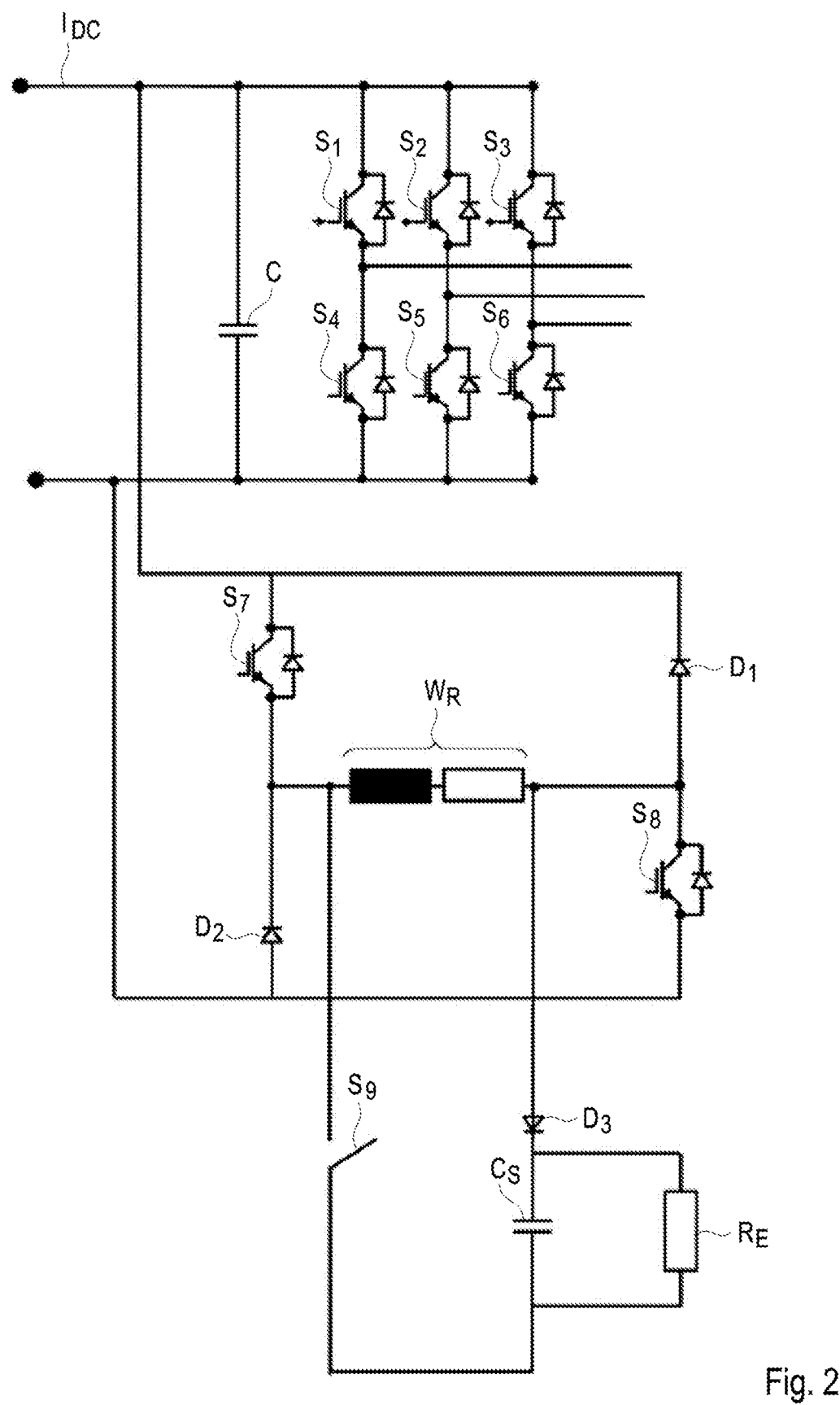
FIG. 2 a circuit diagram of an EESM with a first embodiment of a circuit device.

FIG. 2 shows a circuit diagram of an EESM with a first embodiment of a circuit device according to principles of the present disclosure. A circuit is connected to the poles of the rotor winding $W_R$, which has a diode $D_3$, a snubber capacitor $C_S$ connected downstream of the diode, and a switch $S_9$. A discharge resistor $R_E$, via which the energy of the capacitor $C_S$ can be dissipated, is connected in parallel to the capacitor $C_S$.

To demagnetize the rotor, the switches $S_7$ and $S_8$ are opened and the switch $S_9$ is closed. The current of the rotor then flows through the diode $D_3$ into the capacitor $C_S$. This charges it. The further the capacitor $C_S$ charges, the faster the magnetic energy of the rotor is dissipated. When the magnetic energy of the rotor has gone to zero, the current flow will also have gone to zero. The diode $D_3$ now prevents the capacitor $C_S$ from carrying energy back into the rotor, since it prevents a current backflow. The discharge resistor $R_E$ is used for its ability to dissipate the energy of the snubber capacitor $C_S$.

Figure 3:
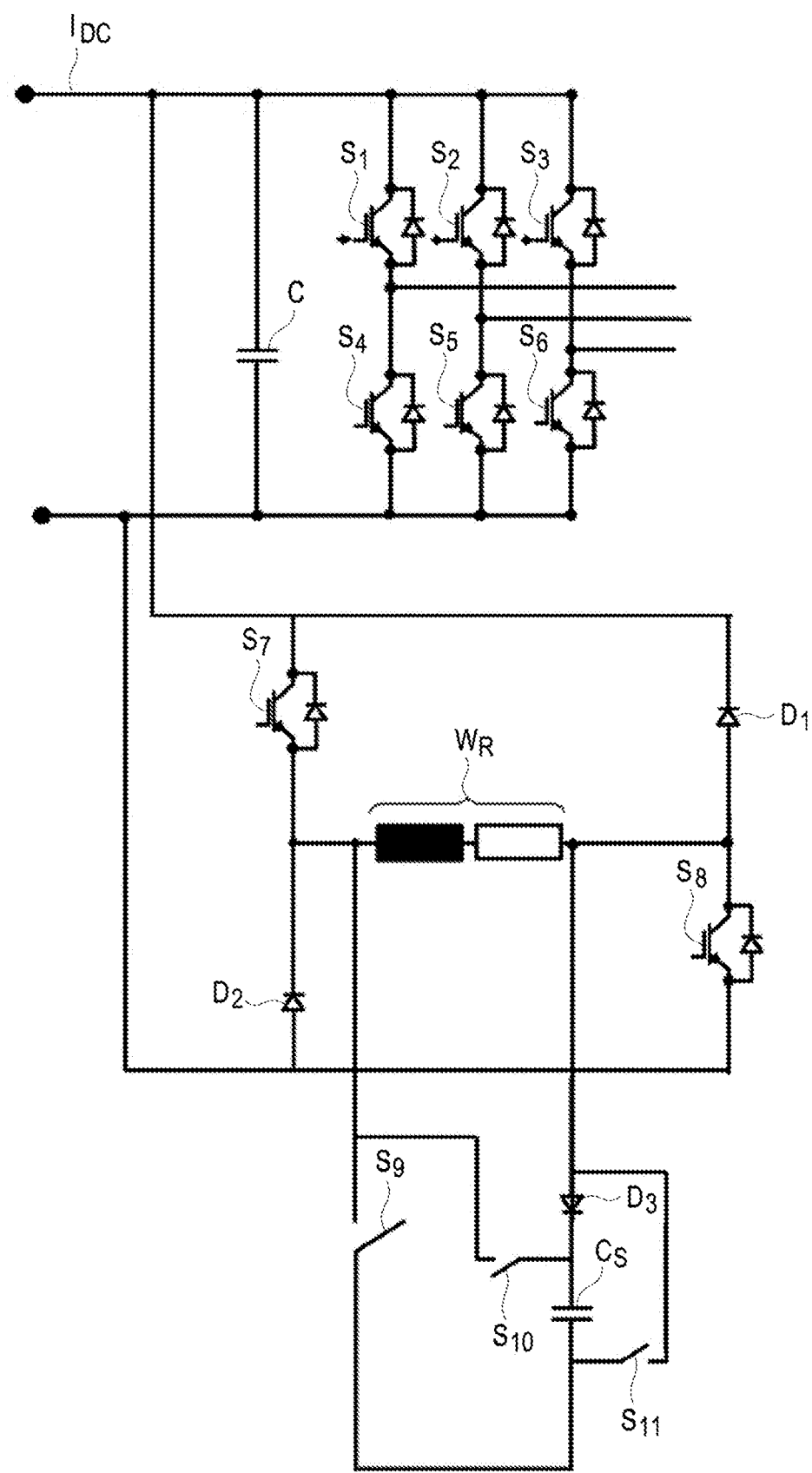
FIG. 3 a circuit diagram of an EESM with a second embodiment of a circuit device.

FIG. 3 shows a circuit diagram of an EESM with a second embodiment of a circuit device according to the principles of the present disclosure, which has no discharge resistor $R_E$.

Instead, the positive electrode of the capacitor $C_S$ is connected via a second switch $S_{10}$ to the positive pole of the rotor winding $W_R$, and the negative electrode of the capacitor $C_S$ is connected via a third switch $S_{11}$ to the negative pole of the rotor winding $W_R$.

If the rotor has now been demagnetized by means of switch $S_9$ and diode $D_3$ and the capacitor $C_S$ has been charged, in order to discharge the capacitor $C_S$ instead of the discharge resistor $R_U$ shown in FIG. 2, or also in combination with the resistor $R_E$ the switches $S_{10}$ and $S_{11}$ can be used. By closing the switches $S_{10}$ and $S_{11}$ the energy of the capacitor $C_S$ can be converted back into magnetic energy in the rotor as soon as driving operation of the vehicle is to be resumed. When the capacitor $C_S$ is discharged to 0V, the switches $S_{10}$ and $S_{11}$ are opened again.

Figure 4:
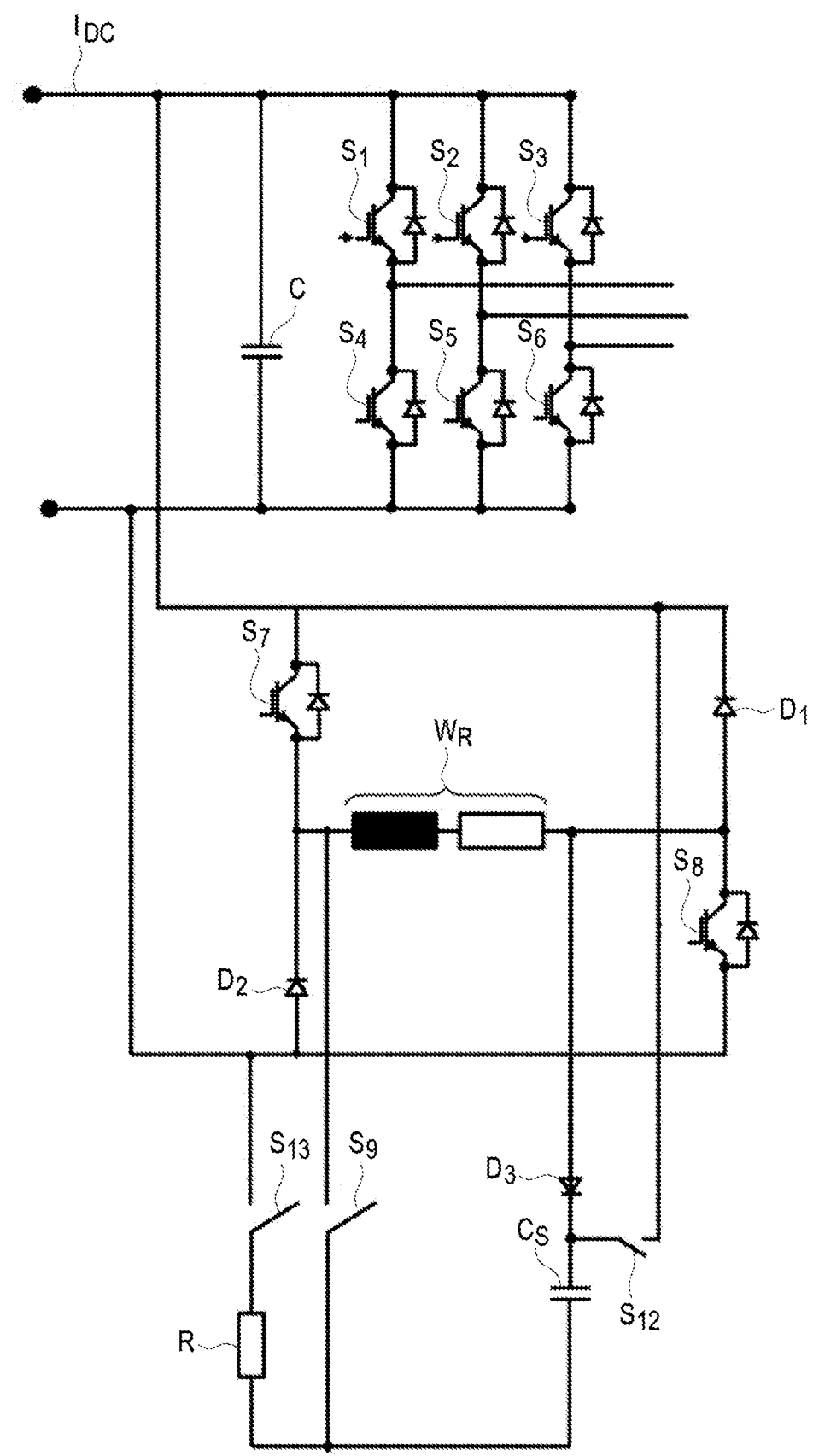
FIG. 4 a circuit diagram of an EESM with a third embodiment of a circuit device.

FIG. 4 shows a circuit diagram of an EESM with a third embodiment of a circuit device according to principles of the present disclosure, in which the positive electrode of the capacitor $C_S$ is connected via a switch $S_{12}$ to the positive electrode of the intermediate circuit capacitor C, and the negative electrode of the capacitor $C_S$ is connected via a resistor R and a switch $S_{13}$ to the negative electrode of the intermediate circuit capacitor C.

If the magnetic energy of the rotor is stored in the capacitor $C_S$, the capacitor $C_S$ and the intermediate circuit capacitor C can be parallelized via the switches $S_{12}$ and $S_{13}$. This then ensures that the energy stored in the snubber capacitor $C_S$ can at least in part flow into the intermediate circuit capacitor C. A resistor R in series with $S_{13}$ here ensures a limitation of the charge-reversal current.

It should be noted here that this embodiment only allows the voltages of the capacitor $C_S$ and of the intermediate circuit capacitor C to be matched. Complete transfer of the electrostatic energy from $C_S$ into C is not possible in this way. To achieve this, the embodiment shown in FIG. 5 is suitable.

Figure 5:
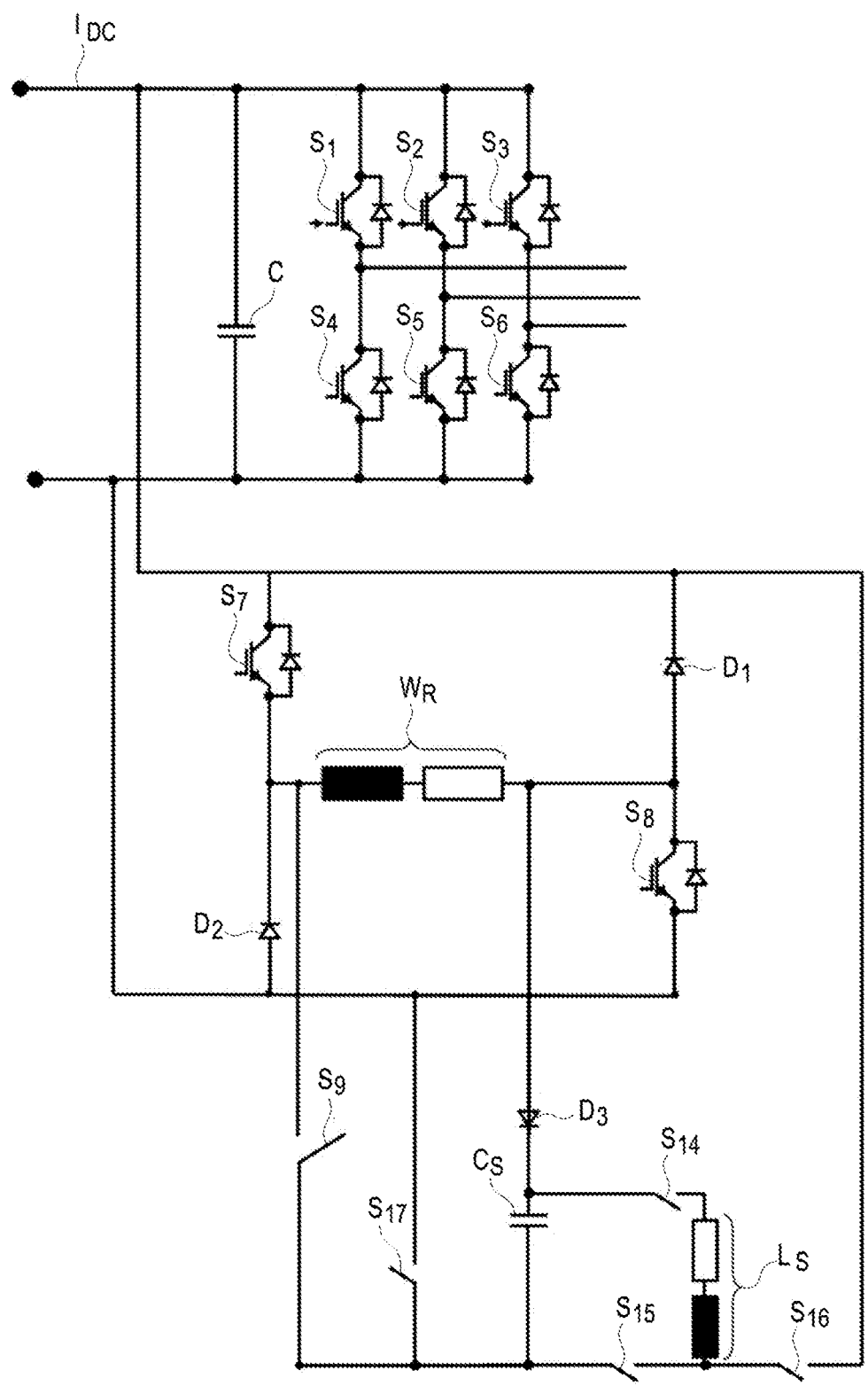
FIG. 5 a circuit diagram of an EESM with a fourth embodiment of a circuit device.

FIG. 5 shows a circuit diagram of an EESM with a fourth embodiment of a circuit device according to principles of the present disclosure in which a storage inductor $L_S$ is connected in parallel with the capacitor $C_S$. The poles of the storage inductor $L_S$ are connected via switches $S_{14}$ and $S_{15}$ to the electrodes of the capacitor $C_S$ and via switches $S_{16}$ and $S_{17}$ to the electrodes of the intermediate circuit capacitor C.

If capacitor $C_S$ is charged by means of switch $S_9$ and diode $D_3$, as already described, and the rotor is fieldless, the switch $S_9$ is opened. The storage inductor $L_S$ can be charged by closing the two switches $S_{14}$ and $S_{15}$. The switch $S_{15}$ is then opened, and the switches $S_{16}$ and $S_{17}$ are closed. The current stored in the inductor $L_S$ then flows through the capacitor C and charges it. This procedure can be repeated until the charge of the capacitor $C_S$ is dissipated and transferred into the capacitor C.

In one variant of the method, the switches $S_{14}$ and $S_{15}$ are closed until the capacitor $C_S$ is completely discharged. The switch $S_{15}$ is then opened and the switches $S_{16}$ and $S_{17}$ are closed until the current flow through the inductor $L_S$ is zero. The switches $S_{16}$ and $S_{17}$ are then opened again and the process is completed. In this way, the number of switching operations is minimized and losses in the switches are as low as possible. However, the maximum energy which has to be stored in the inductor $L_S$ is in this case high.

In an alternative variant of the method, the switches $S_{15}$, $S_{16}$ and $S_{17}$ are switched several times at a higher frequency, and the described procedure is carried out multiple times. The inductor $L_S$ can thereby be dimensioned significantly smaller.

This application claims priority to German patent application no. 10 2019 124 212.6, filed Sep. 10, 2019, which is hereby incorporated herein by reference in its entirety.

Aspects and features of the various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A circuit device for demagnetizing a rotor of an externally excited synchronous machine, comprising at least one circuit connected to poles of a rotor winding of the externally excited synchronous machine and having a diode, a capacitor connected downstream of the diode, and a first switch, wherein the rotor winding, the diode, the capacitor, and the first switch are electrically connected in series, and wherein, when the first switch is closed, a current of the rotor winding flows through the diode into the capacitor.

2. The circuit device according to claim 1, further comprising a first resistor is connected in parallel with the capacitor.

3. The circuit device according to claim 1, wherein a positive electrode of the capacitor is connected via a second switch to a positive pole of the rotor winding, and a negative electrode of the capacitor is connected via a third switch to a negative pole of the rotor winding.

4. The circuit device according to claim 1, wherein a positive electrode of the capacitor is connected via a second switch to a positive electrode of an intermediate circuit capacitor of the externally excited synchronous machine, and a negative electrode of the capacitor is connected via a second resistor and a third switch to a negative electrode of an intermediate circuit capacitor of the externally excited synchronous machine.

5. The circuit device according to claim 1, wherein a positive electrode of the capacitor is connected via a second resistor and a second switch to a positive electrode of an intermediate circuit capacitor of the externally excited synchronous machine, and a negative electrode of the capacitor is connected via a third switch to a negative electrode of an intermediate circuit capacitor of the externally excited synchronous machine.

6. The circuit device according to claim 1, further comprising a storage inductor is connected in parallel to the capacitor.

7. The circuit device according to claim 6, wherein poles of the storage inductor are connected via a second switch and a third switch to electrodes of the capacitor, and via a fourth switch and a fifth switch to electrodes of an intermediate circuit capacitor of the externally excited synchronous machine.

8. A method for demagnetization of a rotor of an externally excited synchronous machine, the method comprising:
providing at least one switching device having a diode, a capacitor connected downstream of the diode, and a first switch, wherein the at least one switching device is electrically conductively connected to poles of at least one rotor winding of the externally excited synchronous machine, wherein the at least one rotor winding, the diode, the capacitor, and the first switch are electrically connected in series, and wherein, when the first switch is closed, a current of the at least one rotor winding flows through the diode into the capacitor; and transferring electromagnetic energy stored in the rotor winding into the capacitor of the at least one switching device.

9. The method according to claim 8, further comprising:

transferring electrical energy stored in the capacitor of the circuit device at least in part into an intermediate circuit capacitor of the externally excited synchronous machine.

10. The method according to claim 8, further comprising:

transferring electrical energy stored in the capacitor of the circuit device at least in part into a storage inductor.

\* \* \* \* \*